METHOD FOR ELECTRODEPOSITION

Filed May 28, 1970 2 Sheets-Sheet 1

United States Patent Office 3,752,750
Patented Aug. 14, 1973

3,752,750
METHOD FOR ELECTRODEPOSITION
Akira Matsushita and Rokuro Fukushima, Kawasaki, Japan, assignors to Akira Matsushita and Takeo Kagitani
Filed May 28, 1970, Ser. No. 41,329
Claims priority, application Japan, May 30, 1969, 44/49,690; May 31, 1969, 44/42,670, 44/42,671
Int. Cl. B01k *5/02;* C23b *13/00*
U.S. Cl. 204—181 5 Claims

ABSTRACT OF THE DISCLOSURE

There are described new methods of coating a substate adapted to function as an anode with an electrodeposited layer in an electrodeposition bath containing therein an electrodepositing liquid prepared by adding at least one of inorganic pigments, magnetic particles and dielectric particles, semiconductive particles, organic pigments, and their mixture to anionic solubilised resin formed by dispersing pigments (for example, a water-soluble alkyd resin containing 10 percent of solids), in which electric potentials of both electrodes of the electrodeposition bath are made equal to each other prior to the application of an electric voltage across them by maintaining electric potential of the substrate at a value lower than that of the electrodepositing liquid or by short-circuiting said both electrodes thereby to discharge the electric charge stored in said electrodepositing liquid, whereby formation of uniform electrodeposited layer on the substrate can be made possible under a constant initial condition of the electrodeposition. Furthermore, apparatuses adapted to carry out the above-mentioned methods are disclosed.

BACKGROUND OF THE INVENTION

The present invention relates to electrodepositing methods adapted to improve electrodeposition characteristics.

Hitherto, for the purpose of carrying out industrially an electrodeposition treatment (electrophoresis coating), there is a conventional method comprising steps of successively immersing a substrate to be electrodeposited into a bath containing an electrodepositing liquid, each substrate being generally utilized as an anode member, and applying an electric voltage between said substrate and a cathode thereby to carry out electrophoresis operation. However, according to this method, any electric charge is stored in the electrodepositing liquid owing to electric voltage applied to the substrate to be electrodeposited which have been successively immersed in the electrodeposition bath, so that nonuniform electrodeposition of the succeeding substrate occurs prior to application of the electric voltage to the succeeding substrate, because although the stored charge attenuates with lapse of time, the remaining charge affects the electric potential of the substrate to be succeedingly electrodeposited. If nonuniform electrodeposition is initially carried out, it is no longer possible to obtain a completely electrodeposited uniform coating layer. On the other hand, in the case of forming an electrodeposited coating layer on a substrate according to electrophoresis coating (hereinafter referred to as "electrodeposition") method, surface of the electrodeposited coating layer is liable to be contaminated due to adherence of bubbles and ducts to said surface, thus causing nonuniform layer surface.

Furthermore, for example, for the purpose of forming an electrodeposited layer made of a magnetic material or a dielectric material on a substrate, hitherto it has been conventional to adopt a method comprising steps of, as shown in FIG. 1, filling an electrodeposition bath or vessel 1 with an electrodepositing liquid 2, immersing a substrate to be electrodeposited (anode member) 4 and a cathode 3 in said liquid, and applying an electric voltage E across said anode member and cathode, thereby to carry out electrophoresis of charged solution and mixed particles. However, according to this method, as clear from FIG. 1, the electric-field distribution between both electrodes is not uniform along all the surfaces of the anode member 4 because of the higher density of the electric-field at its peripheral part, so that as shown in FIG. 2, the electrodepositing current $I_p$ does not become uniform, that is, the current $I_{p1}$ passing through the peripheral part of the anode member 4 is initially larger than the current $I_{p2}$ passing through the central part thus causing an earlier increase of the electrodeposited layer at the peripheral part than at said central part, but with lapse of electrodepositing time $t_p$, particularly after lapse of time $t_1$, the current $I_{p1}$ becomes smaller than the current $I_{p2}$. As mentioned above, during the initial electrodepositing period, the electrodeposition is exceedingly effected at the peripheral part of the anode member 4, so that the layer structure and surface condition of the electrodeposited layer at the peripheral part differ remarkably from those at the central part of the anode member, thus causing differences in the electric characteristics of the electrodeposited layer.

SUMMARY OF THE INVENTION

It is therefore an object of the invention to provide an effective method adapted to form a uniform electrodeposited layer, comprising carrying out a formal electrodeposition after setting the electric potential of the substrate to be electrodeposited at a value lower than that of the electrodepositing liquid or after discharging any electric charge stored in the electrodepositing liquid by means of short-circuiting both electrodepositing electrodes so as to maintain both electrodes at an equal potential at the time of initiating a formal electrodeposition.

It is another object of the invention to provide an effective method adapted to form a uniform electrodeposited layer, comprising a step of previously wetting surface of a substrate to be electrodeposited with the electrodepositing liquid prior to effectuation of the formal electrodeposition process.

The foregoing objects and other objects as well as the characteristic features and functions of the invention will become more apparent and more readily understandable by the following description and the appended claims when read in conjunction with the accompanying drawings, in which the same or equivalent members are designated by the same reference numerals and characters.

DETAILED DESCRIPTION OF THE INVENTION

Figures 1, 2, 3, 4, 5, 6:
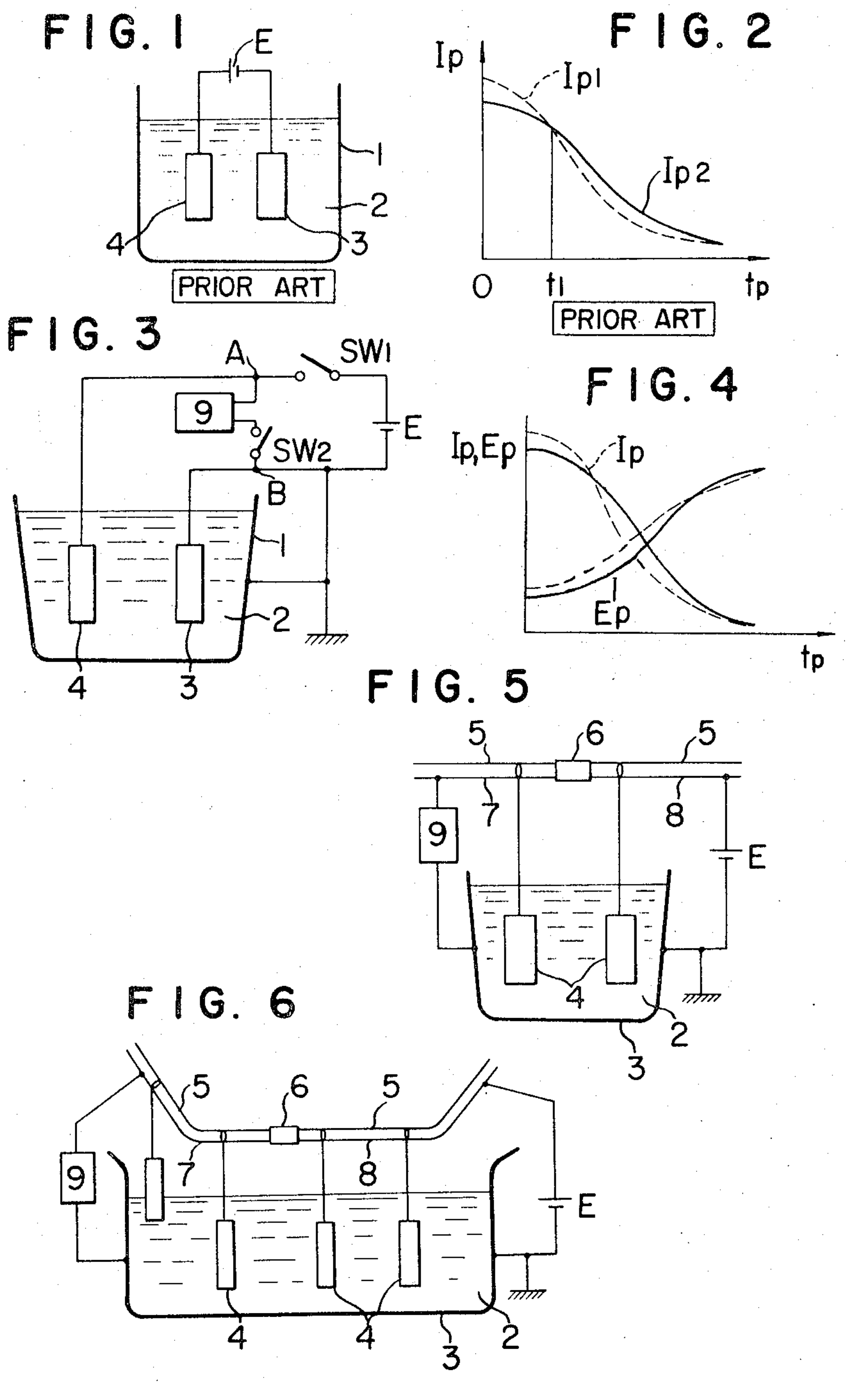
FIG. 1 is a schematic view for showing principle of a conventional method of forming an electrodeposited coating layer according to electrophoresis coating.
FIG. 2 is characteristic curves showing relation between an electrodepositing current $I_p$ and electrodepositing time $t_p$, said curves corresponding to the conventional electrodepositing method.
FIG. 3 is a schematic view for showing an example of the apparatus according to the invention.
FIG. 4 shows characteristic curves of electrodepositing current in the example of FIG. 3.
FIGS. 5 and 6 are schematic views for showing, respectively, different examples of the apparatus according to the invention, each of said examples corresponding to the case in which electrodeposition is continuously carried out.

The apparatus shown in FIG. 3 and showing a basic construction of the apparatuses for carrying out the method according to the invention, comprises an electrodeposition container or bath 1, a liquid bath composed of an electrodepositing liquid 2 filled in the container 1, a cathode 3, and an anode member 4 corresponding to a substrate to be electrodeposited. The anode and cathode comprise electrodes connected to an electric power source E and, a switch $SW_1$ is connected in series to the power source E and a switch $SW_2$ is connected in parallel to the power source E and functions to short-circuit the electrodes 3 and 4. A potential compensator 9 is connected in series to the switch $SW_2$ and operates to compensate the potentials of the points A and B and the potential compensator is designed so as to usually make the potential of the point A higher than that of the point B.

When electrodeposition of the anode member 4 is to be carried out by use of the apparatus shown in FIG. 3, the potential compensator 9 is first adjusted so that the potential of the anode member 4 is made to be lower than that of the electrodepositing liquid 2 or the switch $SW_2$ is closed, without adjustment of the potential compensator 9, so as to short-circuit the electrodes 3 and 4 thereby to discharge the electric charge stored in the electrodepositing liquid 2. In this state, upon complete immersion of the anode member 4 into the electrodepositing liquid 2, the switch $SW_2$ is opened and the switch $SW_1$ is closed and then the electrodepositing process is carried out.

According to such method as mentioned above, the electric charge of the liquid 2 in the region at last surrounding the anode member 4 is previously discharged, thus causing no application of any electrolytic action to the anode member so that by carrying out the succeeding formal electrodepositing process it becomes possible to form a uniform electrodeposited surface on the anode member. In FIG. 4 showing the relationship of the electrodepositing current $I_p$ and its voltage $E_p$ with respect to the electrodepositing period of time $t_p$ in the apparatus of FIG. 3, the full lines correspond to the case in which discharge of the charge stored in the electrodepositing liquid or potential compensation of the anode member is previously achieved prior to formal electrodeposition, and the broken lines correspond to the case in which the above-mentioned discharge or potential compensation is not adapted. As will be clearly understood from the above characteristic curves shown in FIG. 4; in the conventional case in which the formal electrodeposition is carried out in the charged state of the electrodepositing liquid, the initial current $I_p$ and voltage $E_p$ are fluctuantly increased to some extent, whereas in the case of the present invention, the current and voltage are always maintained at their normal values because of no electrolytic action is imparted to the anode member due to previous discharge of the electric energy charged in the electrodepositing liquid or due to lower potential of the anode member than that of the cathode. Consequently, even though a thin layer of thickness below $5\mu$ is to be coated on a substrate by electrodeposition, a very excellent electrodeposited layer having a high quality can be repeatedly formed with accuracy.

The examples of FIGS. 5 and 6 correspond to apparatuses adapted to carry out continuous electrodeposition, in which an electrodeposition bath or vessel serves as the cathode itself.

In the apparatuses of FIGS. 5 and 6, the anode members 4 to be processed are transferred along a rail 5 having an insulating band 6, and the anode members 4 are suspended from the rail into an electrodepositing liquid 2 filled in an electrodeposition bath 3 and maintained at a potential equal to or lower than that of the electrode 3 through a conductive wire 7 and a potential compensator 9. Upon passage of the anode members 4 over the insulating band 6, the anode members are connected to an electric power source E by means of a conductive wire 8 whereby the anode members 4 are applied with positive potential and subjected to electrodeposition. According to the method mentioned above, an electrodeposited layer having high quality can be surely formed around each anode member because the formal electrodeposition is carried out after the anode member is previously protected from becoming nonuniformly electrodeposited state by making potential of the anode members equal to or lower than that of one electrodepositing liquid. Furthermore, in the case when the potential of the anode member to be processed is made lower than that of the cathode, by means of the potential compensator, the potential difference may be made as low as possible as long as no electrolytic action occurs between the anode member and the electrodepositing liquid.

Figure 7:
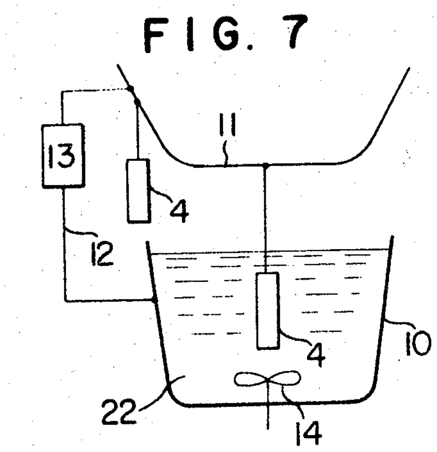
FIG. 7 is a schematic view for showing a damping bath according to the invention.

Another embodiment of the invention will be described in connection with FIGS. 7 and 8. In FIG. 7, a wetting bath 10 is provided and contains therein an electrodepositing liquid 22 into which an anode member 4 to be processed is immersed by suspending the member from a suspender 11. When a plurality of the anode members to be processed are continuously immersed in the bath 10, the suspender 11 may be replaced by an electroconductive conveyor adopted to carry the anode members in the suspended state thereof. The suspender 11 and the wetting bath 10 are short-circuited by a short-circuiting through potential compensator 13. Wetting of the anode member 4 with the electrodepositing liquid 22 can be attained by disturbing the contact surface between the anode member 4 and the electrodepositing liquid 22 by means of, for example, turbulence, stirring, ejection or a supersonic wave or by rubbing the surface of the anode member 4 in the liquid 22. I n the above processing, the anode member to be processed is maintained at a potential lower than or equal to that of the electrodepositing liquid 22 by means of the potential compensator 13 or by short-circuiting the liquid 22 and the anode member 4 through a short-circuiting wire 12 without using the potential compensator 13, whereby the anode member 4 and liquid 22 are maintained at predetermined potentials causing no electrolytic action. The potential distribution mentioned above may be obtained by stirring the liquid 22 by means of a stirring fan 14 having a potential equal to that of the anode member 4, and having an electroconductive surface. Then, the thus wetted anode member 4 is put into an electrodeposition bath 1 shown in FIG. 8 and containing therein an electrodepositing liquid 2, and then an electric power source E is applied across the anode member 4 and a cathode 3 whereby electrodeposition is achieved according to normal method. In this case, the ratio of compositional components of the liquid 22 in the wetting bath 10 may be made different from that of the liquid 2 in the bath 1 so as to make the concentration of the liquid 22 higher than that of the liquid 2. Of course, the concentrations of the liquids 2 and 22 may be made equal to each other.

Figure 8:
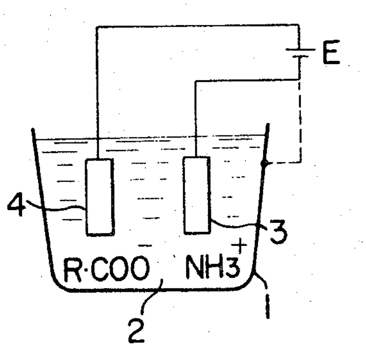
FIG. 8 is a schematic view for showing an electrodeposition bath in which a substrate surface of which has been damped in the damping bath of FIG. 7 is subjected to electrodeposition.
Figure 9:
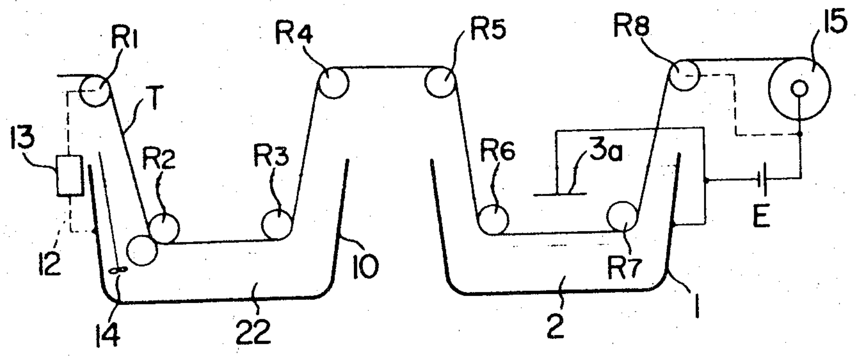
FIG. 9 shows schematically another apparatus example according to the invention, in which the apparatuses shown in FIGS. 7 and 8 are combined.

The apparatus illustrated in FIG. 9 corresponds to the case in which the separated processes such as illustrated in FIGS. 7 and 8 are unified and a magnetic tape on a condenser tape is adopted as the anode member to be processed. In the apparatus shown in FIG. 9, a tape T which is an anode member to be processed is used as an anode and a separate electrode $3a$ (or the electrodeposition bath 1 itself) is used as a cathode. The tape T is transferred through rollers $R_1$ to $R_8$ and then wound around a winding drum 15 or roller $R_8$. Furthermore, in the apparatus shown in FIG. 9, it is preferable to use a press roller as the roller $R_2$ in the wetting bath 10 thereby to cause favorable wetting of the electrodepositing liquid 22 on the surface of the tape T, and undesirable actions due to any weak electric-field can be effectively removed by making the potentials of the tape T and liquid 2 equal to each other by means of, for example, short-circuiting the roller $R_1$ and the bath 1.

According to the examples illustrated in FIGS. 7, 8 and 9, since the anode member to be processed is previously wetted with the electrodepositing liquid, completely uniform electrodeposited layer can be obtained even in the case when a thin layer of thickness below 5μ is to be formed. Moreover, during the wetting operation, liquid agitation is necessarily achieved, whereby mixed fine particles consisting of depositable pigments can be uniformly deposited on the surface of the anode member to be processed. Furthermore, since the wetting liquid 22 does not accept any influences due to electrolytic action, the composition of the wetting liquid 22 is always constant and it is only necessary to supplement a small amount of the wetting liquid 22 which is used up by the anode member to be processed. Of course, the composition of the electrodepositing liquid 2 varies somewhat during electrodepositing treatment, but the composition of the completely electro deposited layer is uniform and stable because the processed anode member surface has been previously processed in the wetting bath 10 so as to be in a sufficiently wetted state.

An actual example of the apparatus shown in FIG. 3 will be described as follows.

Composition of the electrodepositing liquid

| | Percent |
|---|---|
| Acryl resies resin | 25 |
| Pigment (powder of $TiO_2$) | 25 |
| $H_2O$ | 50 |

The mixture of the above components form a main composition and this composition is mixed up so that the liquid resistance may become on the order of 200 Ω/cm. As the article to be processed, a brass plate or Al plate of 100 cm.$^2$ is used and this plate is adopted as an anode, and a stainless plate is used as a cathode. Electrodeposition is carried out by applying a D.C. voltage across the anode and cathode. Now, if a voltage of 100 v. is applied for a period from 60 seconds to 180 seconds, an electrodeposited layer having a thickness of 20–50μ is coated on the anode plate. In this case, the applied voltage is different at the initial period and at the terminal period, but the voltage becomes a constant 100 volt with completion of the layer formation because of the insulative character of said formed layer. Of course, the passing current is continuously adjusted so as to always be a constant value of 2.0 ma./cm.$^2$.

Let is be assumed that the apparatus shown in FIG. 3 is not grounded prior to carrying-out of the electrodeposition. In this case, if there is a certain potential difference between the electrodes 3 and 4 owing to electric charge or other causes, particularly in the case where the potential of the anode plate 4 is higher than that of the anode plate 3; even though the electrodepositing current is not passed ($SW_1$ is off), some electrodeposition action occurs on the surface of the anode plate 4 whereby an extremely thin electrodeposited layer is formed on the surface of the anode plate 4 because the premature electrodeposition phenomena is caused by a low potential due to charged electricity. This electrodeposited thin layer causes nonuniform current distribution on the anode plate during normal current passage, thus resulting in the nonuniform formation of the electrodeposited layer.

Therefore, before applying the normal current, it is required that the electrodepositing liquid is only contacted on the surface of the anode plate 4 which is previously cleaned by means of pretreatment and no action in electrodepositing period is taken place at all. When the electrodeposition is carried out by turning the switch $SW_1$ on, if the voltage E is less than 15 volts ($E<15$ volts), the electrodeposited layer is hardly formed on the surface of the anode plate 4. In other words, if the area of the anode plate 4 is 100 cm.$^2$ or larger, the current caused to flow by this voltage is extremely small in density. Therefore, the electrodeposition action does not take place in practice.

Nevertheless, it is considered that when the liquid or the cathode plate is charged by some reasons as mentioned before, an electrical discharge with a considerable large current density takes place at a part of the anode plate 4, and therefore a thin electrodeposited layer is, in practice, formed thereon.

Therefore, in order to maintain the anode plate 4 at a low potential in any cases other than the normal current passage, a certain potential determined by taking into account liquid quantity, the size of the cathode plate 3 and the electrodeposition bath (in using conductive material) is supplied from an equipment 9 so as to act in contrast with the normal voltage in potential. In this case, the cathode plate 3 always possessed a high potential when a current is not applied, and serves as a so-called compensation electrode such that the electrodeposition due to a charging phenomenon is acted on the surface of said cathode plate 3.

In case the cathode plate 3 is thus employed as the compensation electrode, it is considered that troubles such as potential uneveness take place during normal current passage. In this case, it goes without saying that a cathode plate such that its potential is maintained same as the anode plate 4, is provided (as shown below), thereby to carry out the electrodeposition action between the cathode plate and the anode plate 4 when the normal current passage is obtained. In addition, the influence due to a stray potential may be caused in practice even in the case that the grounding requirement is indicated as shown in FIG. 3, and therefore a circuit such as $SW_2$ is necessary.

Figure 10:
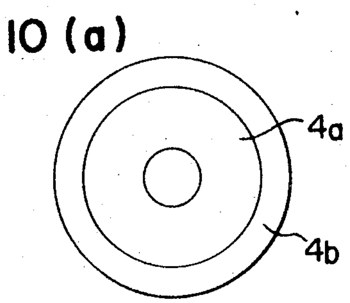
FIGS. 10(*a*) and 10(*b*) are plan view and side view, respectively, of an example of anode structures according to the invention.
Figure 11:
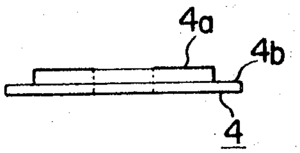
FIG. 11 is a side view of another example of the anode structures according to the invention.
Figure 10:
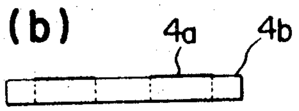

According to the invention, a uniform distribution of electric-field along the surface of the anode member to be processed can be easily obtained in such a manner as illustrated in FIGS. 10 and 11 in connection with a disc-shaped article to be processed.

In the case of FIG. 10, a guard electrode **4*b* is provided around the periphery of an article 4*a* (anode member) to be processed. According to this structure of the article to be processed, the peripheral part of the article 4*a*, is replaced by the periphery of the guard electrode 4*b* so that a uniform electric-field is imparted to the surface of the article 4*a* to be processed thus causing passage of equipotential electrodepositing current along all surfaces of the article 4*a***. Consequently, there is no nonuniform electrodeposition which is liable to occurr in the initial course of the electrodepositing process and such has been regarded as a most important matter for determining the performance of the electrodeposited layer, whereby. Thus, an electrodeposited layer having uniform and stable surface can be easily obtained.

In the case of FIG. 11, a guard electrode **4*b* is provided at the rear surface of the article 4*a* to be processed whereby the electric-field is uniformly distributed along a surface of the article 4*a***.

The structure of FIG. 11 is inferior to that of FIG. 10 because the guard electrode **4*b* is in a plane different from the plane of the article 4*a***, but in the case of FIG. 11, results are obtained which are more favorable than would be the case of using no guard electrode.

According to the invention, as is clear from the above-mentioned description, a uniformly electrodeposited layer can be effectively formed on the surface of a substrate, and accordingly in the case of forming a magnetic thin film for use as a memory device, fluctuation of memory output, *S/N* (signal-noise ratio), and other signals due to fluctuation of the electrodeposited magnetic thin films would not occur, whereby a memory device having a memory ability of high density can be manufactured. Furthermore, in the case of forming a dielectric thin film, fluctuation of dielectric capacity can be effectively avoided. As a whole, highly precise thin layers required various industrial fields can be manufactured.

What is claimed is:

1. A method of carrying out electrodeposition in an electrodepositing liquid comprising: mixing at least one material selected from the group consisting of inorganic pigments, magnetic particles, dielectric particles, semiconductive particles, organic pigments and their mixture with an anionic solubilised resin obtained by dispersing pigments to form an electrodepositing liquid; setting the electric potential of a substrate to be processed at a value lower than that of said electrodepositing liquid prior to formal electrodepositing treatment to maintain the initial electrodepositing condition at a constant level; and carrying out formal electrodeposition to effect formation of a uniform electrodeposited layer on said substrate.

2. A method of uniformly electrodepositing material on a workpiece comprising: providing both a liquid bath composed of an electrodepositable material and an electrode in contact with said liquid bath; disposing an electrically conductive workpiece in said liquid bath in spaced-apart relationship from said electrode; applying an electric potential across said electrode and workpiece of sufficient strength and polarity to effect electrodeposition of said electrodepositable material onto said workpiece accompanied by the creation of charged particles within said liquid bath; and maintaining the electric potential of said workpiece at a value lower than that of said liquid bath until commencement of said applying step to effectively prevent charged particles present in said liquid bath from electrodepositing on said workpiece; whereby a uniform layer of said electrodepositable material is electrodeposited on said workpiece during application of said electric potential across said workpiece and electrode.

3. A method according to claim 2; wherein said providing step comprises providing a liquid bath composed of an electrodepositable material selected from the group consisting of inorganic pigments, magnetic particles, dielectric particles, semiconductor particles, organic pigments and mixtures thereof.

4. A method according to claim 2; including wetting said workpiece with a wetting agent prior to disposing same within said liquid bath.

5. A method according to claim 2; wherein said disposing step comprises successively disposing workpieces in said liquid bath each in spaced-apart relationship from said electrode; wherein said applying step comprises successively applying an electric potential across said electrode and successive ones of said workpieces to effect electrodeposition of said electrodepositable material onto said workpieces accompanied by the creation of charged particles within said liquid bath; and wherein said maintaining step comprises maintaining the electric potential of each workpiece at a value lower than that of said liquid bath until commencement of said applying step to effectively prevent charged particles present in said liquid bath from electrodepositing on said workpiece; whereby a uniform layer of said electrodepositable material is electrodeposited on said workpieces during application of said electric potential across each workpiece and electrode.

References Cited

UNITED STATES PATENTS

| | | | |
|---|---|---|---|
| 3,420,762 | 1/1969 | Shaw et al. | 204—181 |
| 3,532,613 | 10/1970 | Gilchrist | 204—181 |
| 3,418,233 | 12/1968 | Igras et al. | 204—300 EC |
| 3,437,574 | 4/1969 | Sano et al. | 204—181 |
| 3,492,214 | 1/1970 | Beck | 204—181 |

HOWARD S. WILLIAMS, Primary Examiner

U.S. Cl. X.R.

204—300